(12) United States Patent
Sekita

(10) Patent No.: US 6,735,020 B2
(45) Date of Patent: May 11, 2004

(54) ZOOM LENS AND IMAGE PICKUP APPARATUS

(75) Inventor: Makoto Sekita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/211,010

(22) Filed: Aug. 2, 2002

(65) Prior Publication Data

US 2003/0117716 A1 Jun. 26, 2003

(30) Foreign Application Priority Data

Aug. 7, 2001 (JP) ..................................... 2001-239597

(51) Int. Cl.[7] .............................................. G02B 15/177
(52) U.S. Cl. ...................................... 359/682; 359/689
(58) Field of Search ................................. 359/689, 680, 359/681, 682, 713–716

(56) References Cited

U.S. PATENT DOCUMENTS

| | | | |
|---|---|---|---|
| 4,838,666 A | 6/1989 | Shiraishi ..................... | 350/427 |
| 5,054,897 A | 10/1991 | Ozawa | |
| 5,357,374 A | 10/1994 | Ohno ......................... | 359/689 |
| 5,646,777 A * | 7/1997 | Ohshita ....................... | 359/422 |
| 6,308,011 B1 | 10/2001 | Wachi et al. .................. | 396/72 |
| 6,646,815 B2 * | 11/2003 | Nobe ........................... | 359/689 |
| 2002/0051301 A1 * | 5/2002 | Noguchi et al. ............. | 359/689 |

FOREIGN PATENT DOCUMENTS

| | | |
|---|---|---|
| JP | 63-135913 | 6/1988 |
| JP | 3-155513 | 7/1991 |
| JP | 5-323190 | 12/1993 |
| JP | 7-261083 | 10/1995 |
| JP | 9-21950 | 1/1997 |
| JP | 2000-111798 | 4/2000 |

* cited by examiner

Primary Examiner—Scott J. Sugarman
Assistant Examiner—Deborah Raizen
(74) Attorney, Agent, or Firm—Morgan & Finnegan, L.L.P.

(57) ABSTRACT

The present invention provides a zoom lens suitable for an image pickup system using a solid-state image pickup element. In detail, the zoom lens disclosed in the present invention includes three lens units having negative, positive, and positive optical power in order from an object side to an image side, in which zooming is performed by moving each lens unit in the direction of an optical axis. The first lens unit has at least one positive lens and at least one negative lens. The second lens unit has at least one positive lens and at least one negative lens, in which a plastic lens of positive optical power is disposed on the side closest to the object.

19 Claims, 10 Drawing Sheets

ZOOM LENS AND IMAGE PICKUP APPARATUS

BACKGROUND OF THE INVENTION

1. Field of the Invention

This invention relates to a zoom lens suitable for still cameras, video cameras, or digital still cameras, and relates to an image pickup apparatus using the lens.

2. Description of Related Art

Recently, with the trend toward making an image pickup apparatus (camera), such as a video camera or a digital still camera that uses a solid-state image pickup element, compact, or toward making the apparatus highly functional, demands have been made for a zoom lens in which the entirety of a lens system is compact, is superior in performance, and is capable of being easily manufactured.

In this type of camera, various optical members, such as a low-pass filter and a color correction filter, are disposed between a rearmost lens part and an image pickup element, and, accordingly, a lens system with a relatively long back focus is required for an optical system used for it. Further, in a color camera that employs an image pickup element used for color images, an optical system used for it is desired to be superior in telecentric characteristics on an image side, in order to avoid color shading.

Conventionally, a two-unit zoom lens of a so-called short zoom type which consists of two lens units, i.e., a first lens unit having negative optical power (the optical power is the reciprocal of a focal length) and a second lens unit having positive optical power and in which the variation of magnification is performed while changing a lens interval between the two units is known as a zoom lens designed to be compact. In this short zoom type optical system, the variation of magnification is performed by moving the second lens unit of positive optical power, and image-point position compensation that depends on the variation of magnification is performed by moving the first lens unit of negative optical power.

Further, various optical systems that use a large number of plastic lenses are proposed in order to easily manufacture a product having a simple structure. For example, Japanese Laid-Open No. H3-15513 proposes an optical system applied to the short zoom type two-unit zoom lens.

Generally, the short zoom type two-unit zoom lens has a long back focus required for an optical system that uses the above-mentioned solid-state image pickup element, and has difficulty in keeping telecentric characteristics superior.

In order to lengthen the back focus and improve the telecentric characteristics, a three-unit zoom lens system in which a third lens unit having positive optical power is disposed on the image plane side of the short zoom type two-unit zoom lens has been proposed, for example, in Japanese Laid-Open No. S63-135913 (corresponding to U.S. Pat. No. 4,838,666), Japanese Laid-Open No. H7-261083, and Japanese Laid-Open No. 2000-111798 (corresponding to U.S. Pat. No. 6,308,011).

In the three-unit zoom lens proposed in these publications, the number of lenses making up each lens unit is relatively large, and the entire length of a lens system is long. In addition, there was a tendency towards difficulties in manufacturing, as a glass-made aspherical lens is used.

Like the short zoom type two-unit zoom lens, a three-unit zoom lens that consists of lens units of negative-positive-positive optical power that use plastic lenses is disclosed, for example, in Japanese Laid-Open No. H5-323190 (corresponding to U.S. Pat. No. 5,357,374) and Japanese Laid-Open No. H9-21950.

In Japanese Laid-Open No. H5-323190, each lens unit is made up of single plastic lens. Although excellent from a manufacturing viewpoint, improvements must be made to its optical performance from the viewpoint of a zoom lens to be used for a high-pixel solid-state image pickup element of the present day.

In Japanese Laid-Open No. H9-21950, the first and second lens units are moved while the third lens unit is being fixed when zooming, and at least two plastic lenses are used for the first and second lens units.

The zoom lens disclosed in these publications has the following disadvantages.

Since the third lens unit is fixed when zooming, variation of magnification needs to be performed only by the second lens unit, making it difficult to perform aberration correction.

The number of plastic lenses is half or less than the number of all lenses, and there is room for improvement from a manufacturing viewpoint.

Since the nearest-to-object lens of the second lens unit in which an axial light ray is most distant from an optical axis is a glass-made lens, it is difficult to correct spherical aberrations and comatic aberrations.

SUMMARY OF THE INVENTION

The present invention has been made in consideration of these conventional examples, and it is an object of the present invention to provide a zoom lens that is suitable for a photographic system using a solid-state image pickup element, small in the number of lenses, compact, and has excellent optical performance.

In order to achieve the above-mentioned object, the zoom lens of the present invention includes three lens units of negative, positive, and positive optical powers in order from an object side to an image side, in which zooming is performed by moving each lens unit in the direction of an optical axis. A first lens unit has at least one positive lens and at least one negative lens. A second lens unit has at least one positive lens and at least one negative lens, and a plastic lens of positive optical power is disposed on a closest-to-object side.

A more concrete form of the present invention will become apparent from embodiments described later.

DETAILED DESCRIPTION OF THE PREFERRED EMBODIMENTS

Hereinafter, preferred embodiments of the invention will be described in detail with reference to the drawings.

Figure 1:
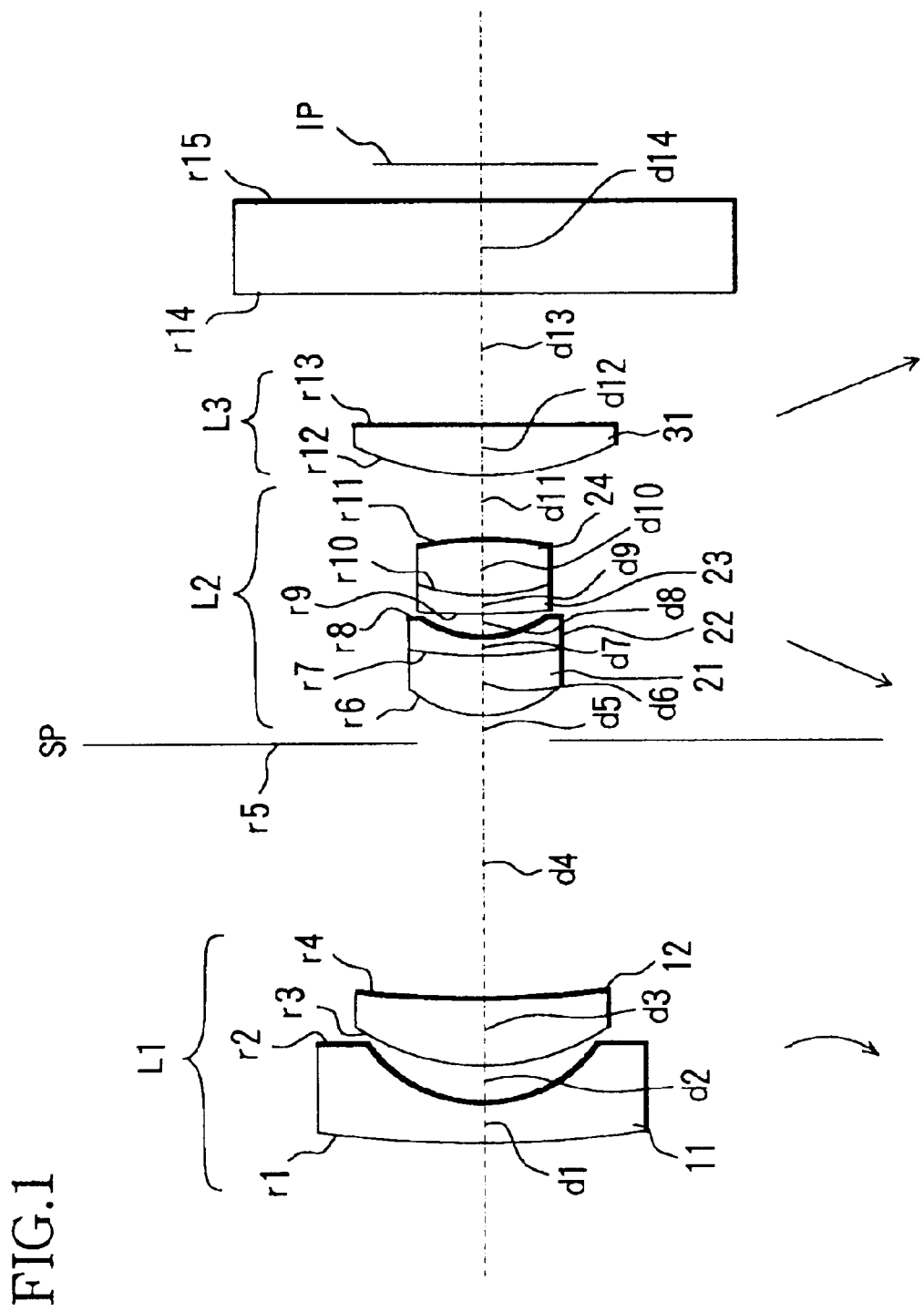
FIG. 1 is a sectional view of a zoom lens of Embodiment 1.
Figure 2:
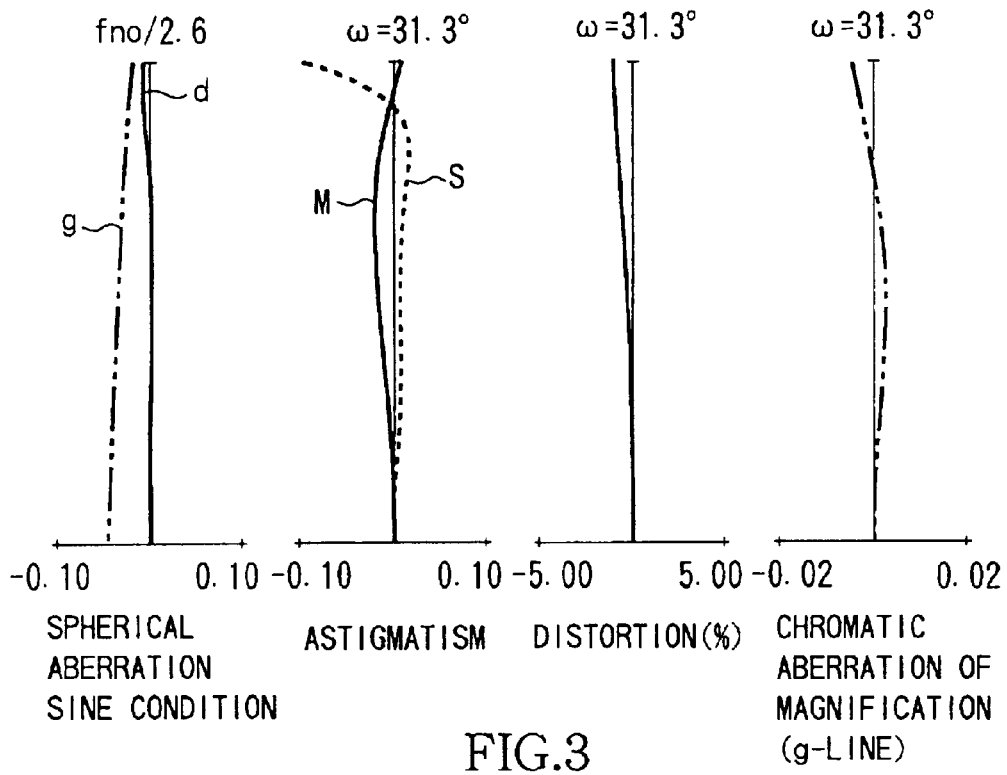
FIG. 2 is a view showing the aberration at a wide-angle end of the zoom lens of Embodiment 1.
Figure 3:
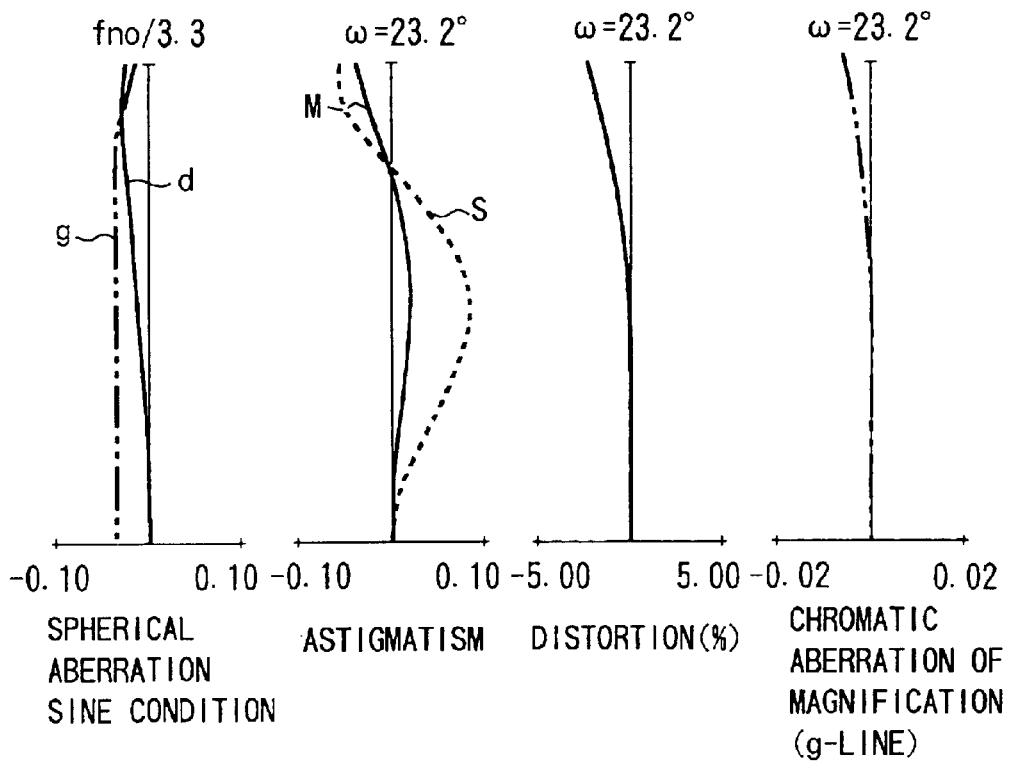
FIG. 3 is a view showing the aberration at a middle zoom position of the zoom lens of Embodiment 1.
Figure 4:
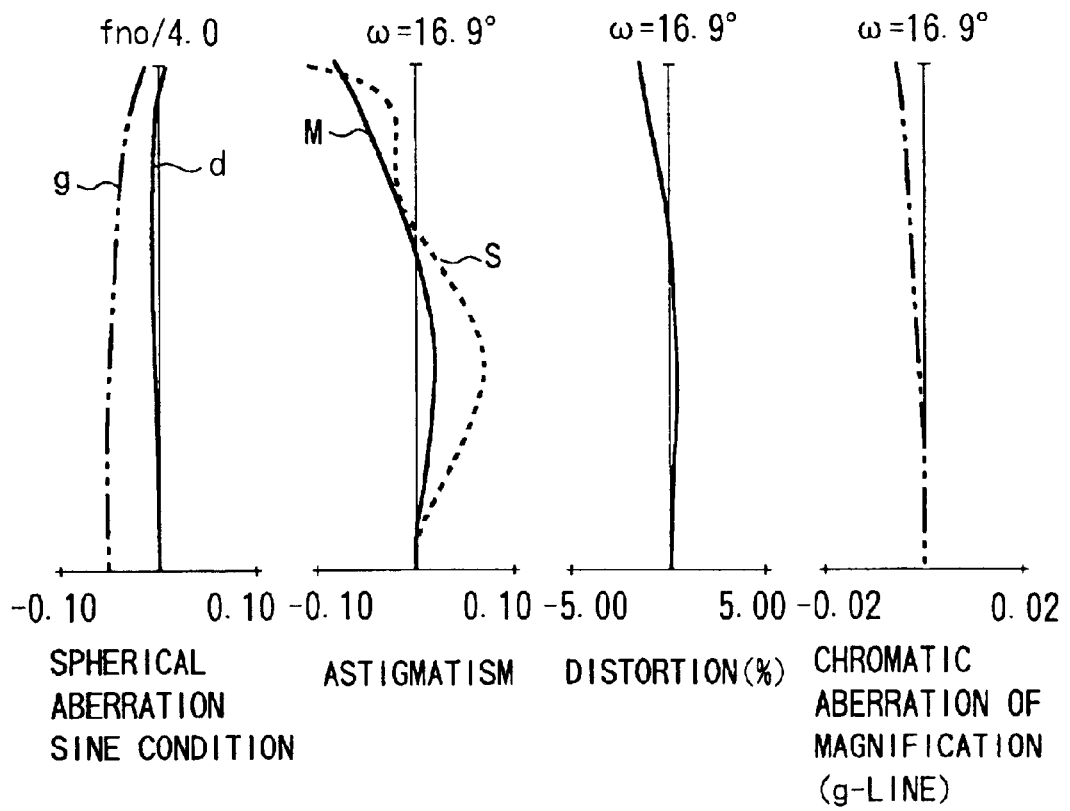
FIG. 4 is a view showing the aberration at a telephoto end of the zoom lens of Embodiment 1.

FIG. 1 is a sectional view of a zoom lens of Embodiment 1 described later. FIG. 2 through FIG. 4 are views showing the aberrations at a wide-angle end, at a middle zoom position, and at a telephoto end, respectively, of the zoom lens of Embodiment 1.

Figure 5:
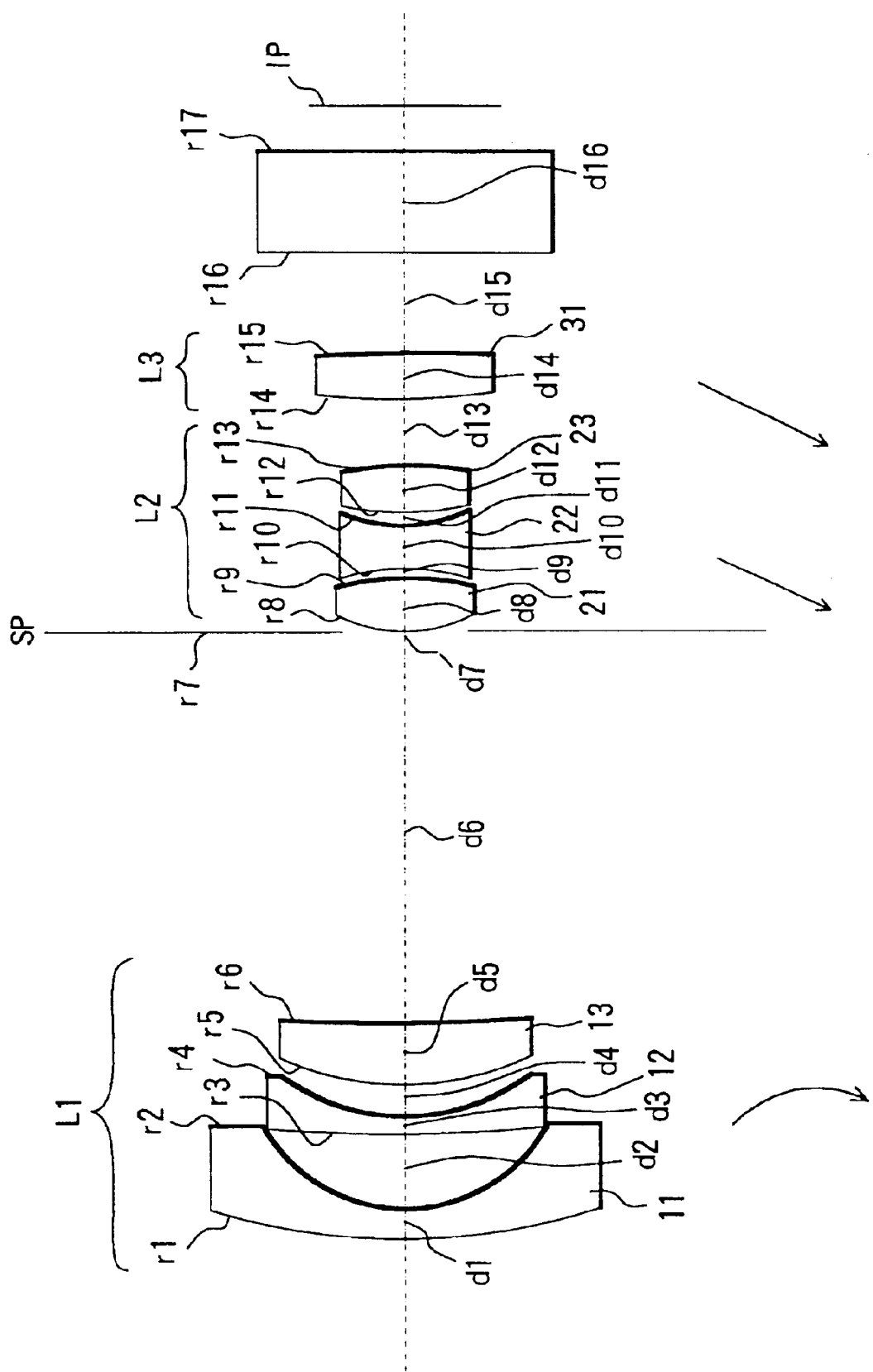
FIG. 5 is a sectional view of a zoom lens of Embodiment 2.
Figure 6:
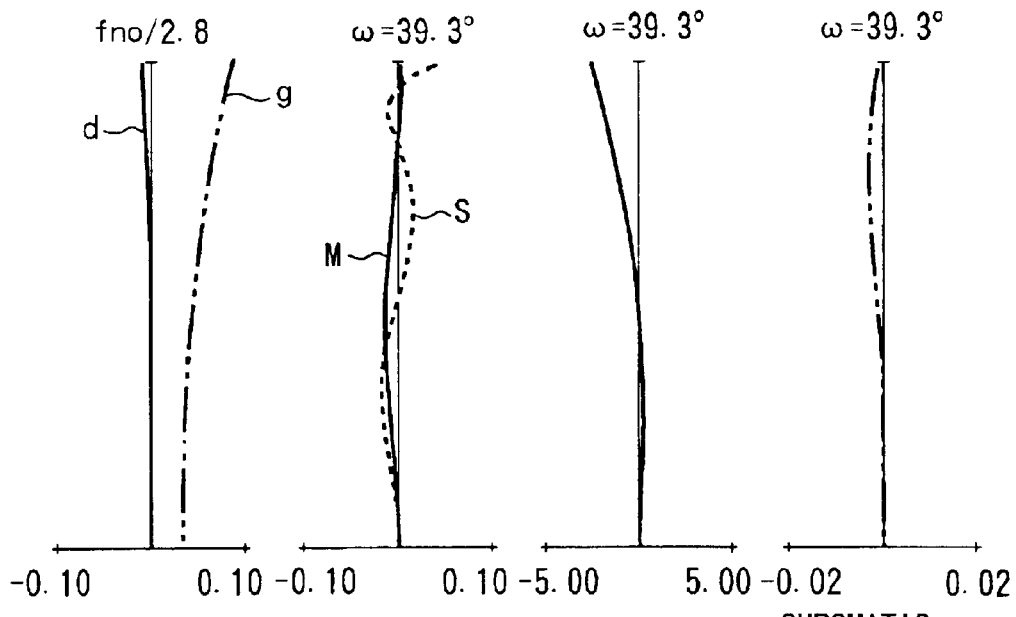
FIG. 6 is a view showing the aberration at a wide-angle end of the zoom lens of Embodiment 2.
Figure 7:
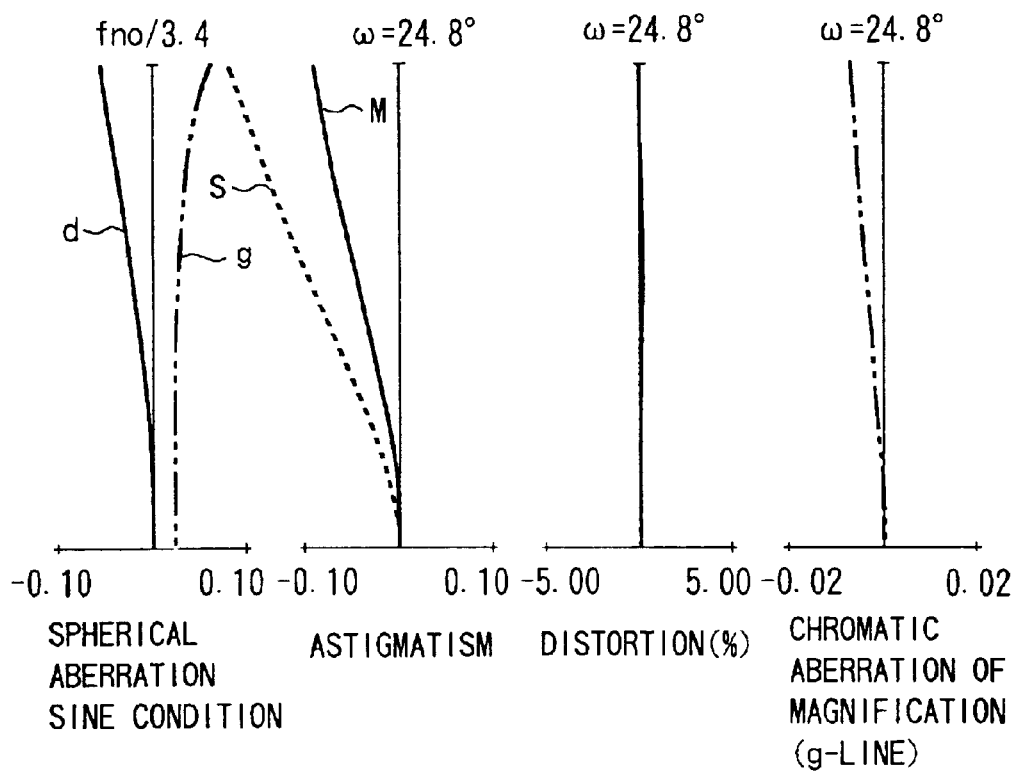
FIG. 7 is a view showing the aberration at a middle zoom position of the zoom lens of Embodiment 2.
Figure 8:
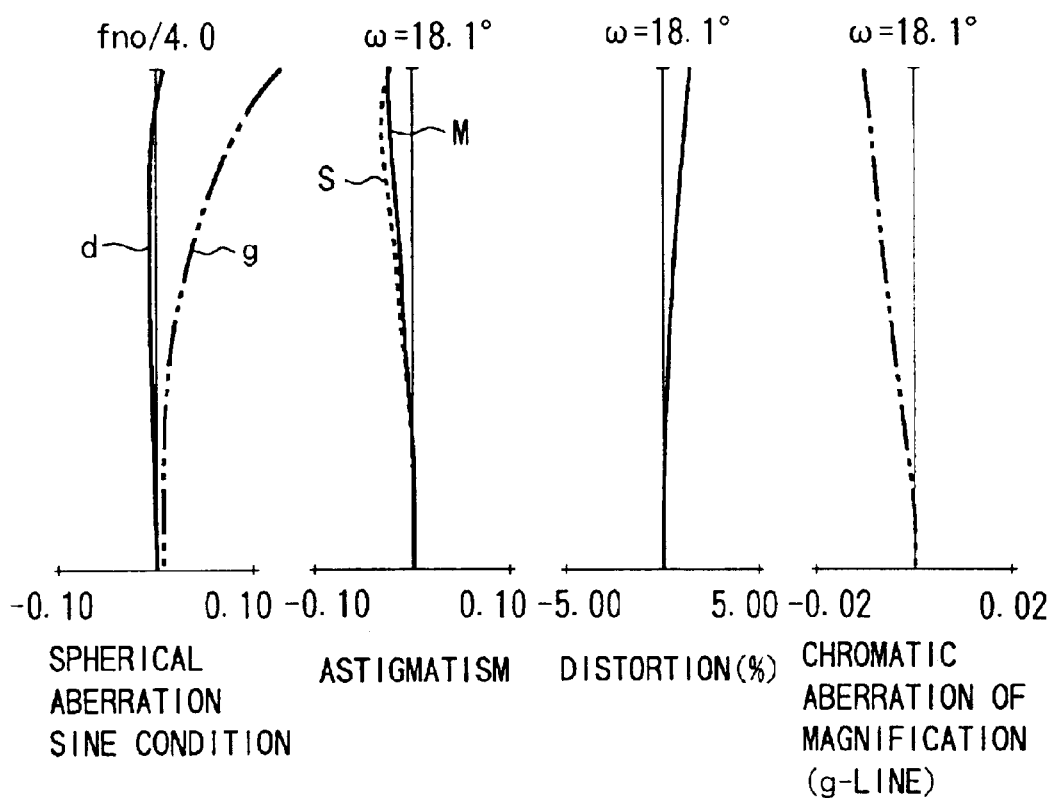
FIG. 8 is a view showing the aberration at a telephoto end of the zoom lens of Embodiment 2.

FIG. 5 is a sectional view of a zoom lens of Embodiment 2 described later. FIG. 6 through FIG. 8 are views showing the aberrations at a wide-angle end, at a middle zoom position, and at a telephoto end, respectively, of the zoom lens of Embodiment 2.

Figure 9:
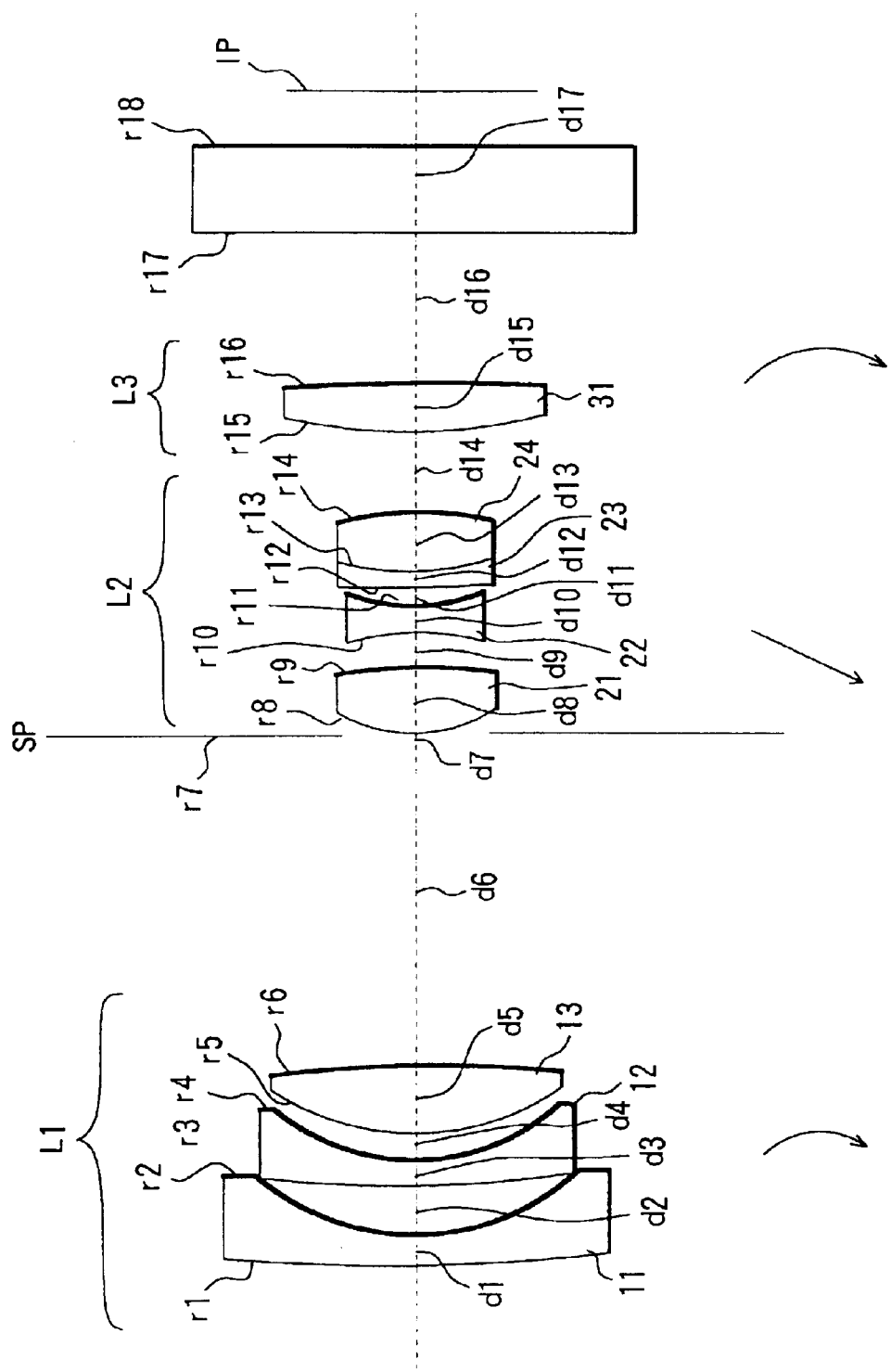
FIG. 9 is a sectional view of a zoom lens of Embodiment 3.
Figure 10:
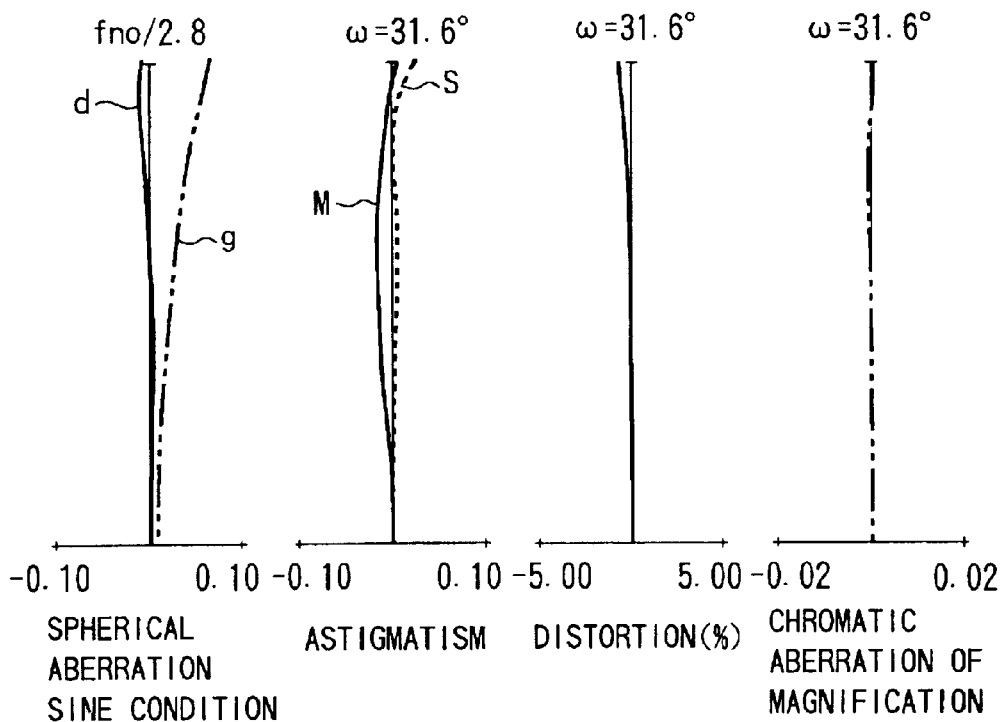
FIG. 10 is a view showing the aberration at a wide-angle end of the zoom lens of Embodiment 3.
Figure 11:
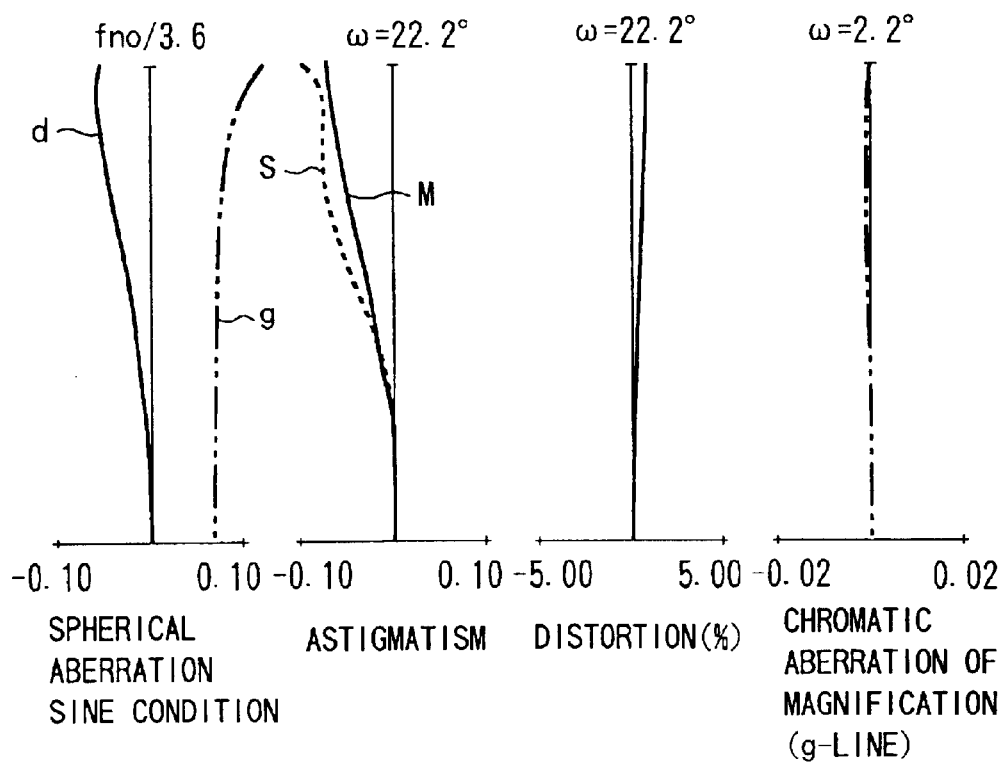
FIG. 11 is a view showing the aberration at a middle zoom position of the zoom lens of Embodiment 3.
Figure 12:
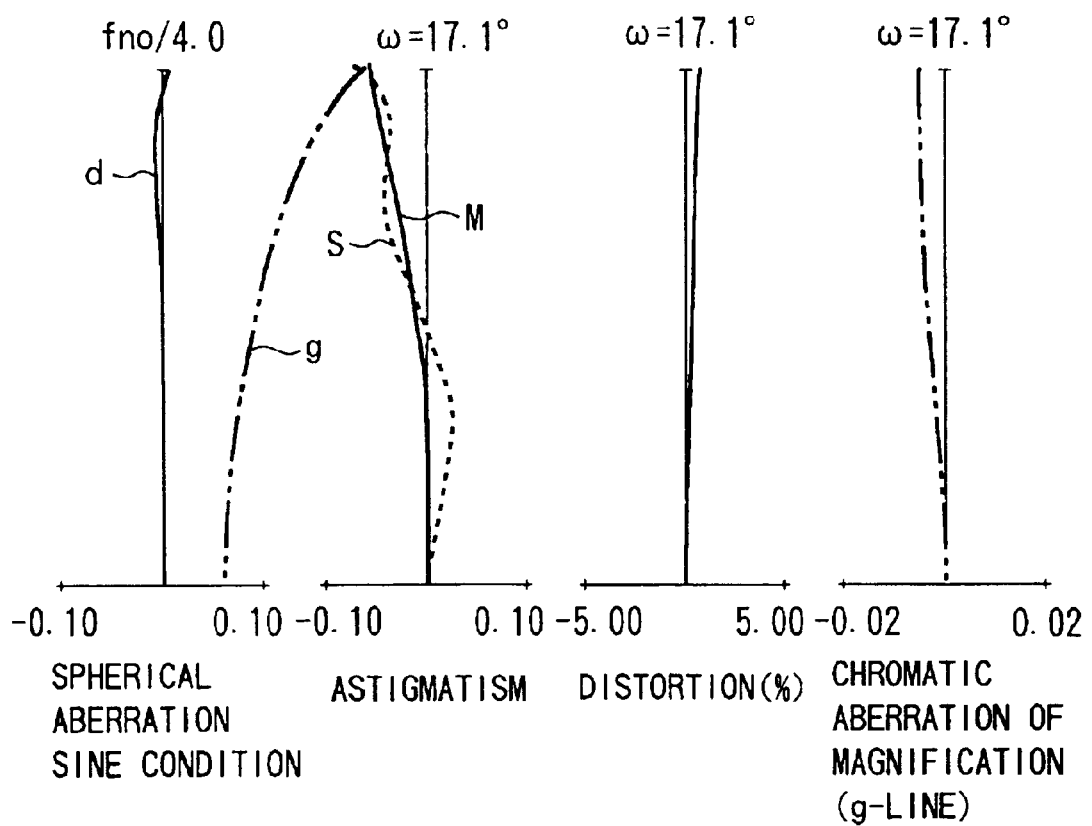
FIG. 12 is a view showing the aberration at a telephoto end of the zoom lens of Embodiment 3.

FIG. 9 is a sectional view of a zoom lens of Embodiment 3 described later. FIG. 10 through FIG. 12 are views showing the aberrations at a wide-angle end, at a middle zoom position, and at a telephoto end, respectively, of the zoom lens of Embodiment 3.

In each lens sectional view, L1 designates a first lens unit having negative optical power, L2 designates a second lens unit having positive optical power, L3 designates a third lens unit having positive optical power, SP designates an aperture stop, and IP designates an image plane. G designates a glass block, such as a filter or a color separation prism.

The zoom lens of each embodiment includes three lens units, i.e., the first lens unit L1 of negative optical power, the second lens unit L2 of positive optical power, and the third lens unit L3 of positive optical power in order from an object side, and, during zooming from the wide-angle end to the telephoto end, the first lens unit L1 reciprocatively moves in a convex locus toward the image side, the second lens unit L2 moves to the object side, and the third lens unit L3 moves to the object side or to the image plane side.

Variation of magnification is mainly performed by moving the second lens unit L2. A variation of an image point caused by the variation of magnification is corrected by the reciprocative movement of the first lens unit L1 and the movement of the third lens unit L3.

The third lens unit L3 shares an increase in the optical power of the zoom lens resulting from a size reduction of an image pickup element, and, by reducing the optical power of a short zoom system made up of the first and second lens units L1 and L2, aberrations are prevented from occurring especially in each lens making up the first lens unit L1, thereby achieving a superior optical performance.

Further, telecentric image formation on the image side necessary for an image pickup apparatus (optical apparatus) that uses a solid-state image pickup element as an image pickup element is achieved by allowing the third lens unit L3 to have a role of a field lens.

Further, the effective outer diameter of lenses that constitute the first lens unit L1 is prevented from increasing by disposing the aperture stop SP on the closest-to-object side of the second lens unit L2 and by diminishing the distance between an entrance pupil and the first lens unit L1 on the wide angle side. Further, without increasing the number of constituent lenses, an excellent optical performance is obtained by canceling off-axis aberrations by means of the first and third lens units L1 and L3 with the aperture stop disposed on the object side of the second lens unit L2 therebetween.

Next, the lens structure of each embodiment will be described.

Embodiment 1 of FIG. 1 shows a zoom lens in which the variable magnification ratio is 2 and in which the aperture ratio is about 2.6 to 4.0.

In Embodiment 1, the first lens unit L1 of negative optical power consists of two lenses of a meniscus-like negative lens 11 in which the concave surface is directed to the image plane side and a meniscus-like positive lens 12 in which the convex surface is directed to the object side in order from the object side.

The second lens unit L2 of positive optical power consists of four lenses of a meniscus-like positive lens 21 in which the concave surface is directed to the image plane side, a meniscus-like negative lens 22 in which the convex surface is directed to the object side, a meniscus-like negative lens 23 in which the convex surface is directed to the object side, and a positive lens 24 both lens surfaces of which are convex in order from the object side, in which the positive lens 21 and the negative lens 22 are cemented to each other, and the negative lens 23 and the positive lens 24 are cemented to each other.

The third lens unit L3 of positive optical power consists of a meniscus-like positive lens 31 in which the convex surface is directed to the object side.

In this embodiment, the material of the positive lens 21, the negative lens 22, and the negative lens 23 of the second lens unit and the material of the positive lens 31 of the third lens unit are plastic (resin), and, in all of the lenses having a seven-lens structure, four lenses are plastic. The material of the positive lens is acrylic, and that of the negative lens is polycarbonate.

Embodiment 2 of FIG. 5 shows a zoom lens in which the variable magnification ratio is 2.5 and in which the aperture ratio is about 2.8 to 4.0.

In Embodiment 2, the first lens unit L1 of negative optical power consists of three lenses of a meniscus-like negative lens 11 in which the concave surface is directed to the image plane side, a meniscus-like negative lens 12 in which the concave surface is likewise directed to the image plane side, and a meniscus-like positive lens 13 in which the convex surface is directed to the object side in order from the object side.

The second lens unit L2 of positive optical power consists of three lenses of a positive lens 21 both lens surfaces of which are convex, a negative lens 22 both lens surfaces of which are concave, and a positive lens 23 both lens surfaces of which are convex in order from the object side.

The third lens unit L3 of positive optical power consists of a positive lens 31 both lens surfaces of which are convex.

In this embodiment, the material of the negative lens 11 of the first lens unit L1, the material of the positive lens 21 and the negative lens 22 of the second lens unit L2, and the material of the positive lens 31 of the third lens unit are plastic, and, in all of the lenses having a seven-lens structure, four lenses are plastic. The material of the negative lens 11, the positive lens 21, and the positive lens 31 is acrylic, and that of the negative lens 22 is polycarbonate.

Embodiment 3 of FIG. 9 shows a zoom lens in which the variable magnification ratio is 2 and in which the aperture ratio is about 2.8 to 4.0.

In this embodiment, during zooming from the wide-angle end to the telephoto end, the first lens unit and reciprocatively moves in a convex locus toward the image side, the second lens unit moves to the object side, and the third lens unit moves in a convex locus toward the image side.

In Embodiment 3, the first lens unit L1 of negative optical power consists of three lenses of a meniscus-like negative lens 11 in which the concave surface is directed to the image plane side, a meniscus-like negative lens 12 in which the concave surface is likewise directed to the image plane side, and a positive lens 13 both lens surfaces of which are convex in order from the object side.

The second lens unit L2 of positive optical power consists of four lenses of a positive lens 21 both lens surfaces of which are convex, a negative lens 22 both lens surfaces of which are concave, a meniscus-like negative lens 23 in which the convex surface is directed to the object side, and a positive lens 24 both lens surfaces of which are convex in order from the object side, and the negative lens 23 and the positive lens 24 are cemented to each other.

The third lens unit L3 of positive optical power consists of a positive lens 31 both lens surfaces of which are convex.

In this embodiment, the material of the negative lens 11 and the positive lens 13 of the first lens unit, the material of the positive lens 21, the negative lens 22, and the negative lens 23 of the second lens unit, and the material of the positive lens 31 of the third lens unit are plastic, and, in all of the lenses having an eight-lens structure, six lenses are plastic. The material of the negative lens 11, the positive lens 21, and the positive lens 31 is acrylic, and the material of the positive lens 13, the negative lens 22, and the negative lens 23 is polycarbonate.

As described above, by forming a lens structure in which each lens unit is disposed to have a desired optical power and to perform aberration correction, the lens system can be made compact while maintaining a superior optical performance.

Next, features common to each embodiment mentioned above will be described.

The first lens unit L1 has a role which allows an off-axis principal ray to form an image of the pupil on the center of the aperture stop SP, and, since the off-axis principal ray is large in the amount of refraction especially on the wide angle side, off-axis aberrations, especially astigmatism and distortion, easily occur.

Therefore, like a wide-angle lens used in most cases, a two-lens structure having, in order from the object side, a negative lens and a positive lens, or a three-lens structure having a negative lens, a negative lens, and a positive lens is employed in which the diameter of the lens on the closest-to-object side is prevented from increasing.

In addition, astigmatism and distortion are corrected in a well balanced manner by, if necessary, forming the lens surface on the image side of the meniscus-like negative lens 11 into an aspherical surface in which the negative optical power becomes weak on the periphery.

Herein, the negative lens 11 has the largest lens diameter, and greater advantages in manufacture and in weight can be obtained by manufacturing the negative lens 11 with plastic material as in Embodiment 2 and in Embodiment 3 than a case in which this lens is manufactured through grinding or molding with glass material.

Each lens that constitutes the first lens unit L1 is formed in a shape similar to a concentric spherical surface that centers the intersection of the stop SP and the optical axis, in order to prevent the occurrence of off-axis aberrations caused by the refraction of an off-axis principal ray.

In the second lens unit L2, a positive lens 21 in which the strong convex surface is directed to the object side is disposed on the closest-to-object side in the lens unit, so that the refractive angle of an off-axis principal ray emitted from the first lens unit L1 is reduced, and thereby various off-axis aberrations do not preferably occur whenever possible.

The positive lens 21 is a lens through which an axial ray travels at the greatest height, and the lens 21 is involved chiefly in correcting spherical aberrations and comatic aberrations.

The fact that the height at which an axial ray travels through the lens is the highest indicates that the height is a place where the effect of the aspherical surface can be most brought about in lenses that constitute the second lens unit L2. In each embodiment, the lens surface on the object side of the positive lens 21 is shaped to be aspherical so that positive optical power becomes weak on the periphery, thus correcting the spherical aberrations and the comatic aberrations favorably.

Further, like the negative lens 11 of the first lens unit L1, a greater advantage in manufacture can be obtained by manufacturing the positive lens 21 with plastic material than a case in which it is manufactured with glass material.

Further, the negative lens 22 made of plastic is disposed adjacent to the image plane side of the positive lens 21. As a result, in the zoom lens of a three-unit structure having negative, positive, and positive optical power lens units, sensitivity to the surface-shape change of lenses that constitute the second lens unit serving chiefly for variation of magnification is higher than lenses of the other lens units. Thus although the influence of the surface-shape change caused by temperature/humidity is a matter of most concern by using plastic lenses, aberration variations are canceled by the fact that the negative lens 22 that is paired with the positive lens 21 is a plastic lens to produce the amount of spherical aberration or comatic aberration with an opposite sign.

The third lens unit L3 consists of a positive lens 31 in which the convex surface is directed to the object side and serves as a field lens in which the image side is telecentric. The surface on the object side of the positive lens 31 is shaped to be aspherical so that positive optical power becomes weak on the periphery, contributing to the correction of various off-axis aberrations in the entire area of zooming.

Herein, like the negative lens 11 of the first lens unit L1 and like the positive lens 21 of the second lens unit L2, a greater advantage in manufacture can be obtained by manufacturing the positive lens 31 with plastic material than a case in which it is manufactured with glass material.

Although a superior optical performance can be obtained by moving the first lens unit L1 to the object side, it is more desirable to move the third lens unit L3 to the object side when taking images of a short-range object from an infinite object by use of the zoom lens of each embodiment.

The reason being that it is possible to stop an increase in lens diameter caused by focusing the first lens unit L1 disposed on the closest-to-object side and stop an increase in the load of an actuator caused by moving the first lens unit L1 in which the weight is heaviest, and it becomes possible to move the first lens unit L1 and the second lens unit L2 which are simply connected to each other, for example, with a cam during zooming, thereby achieving simplification of a mechanical structure and achieving an accuracy improvement.

Further, when focusing is performed by the third lens unit L3, the telephoto end that has a great focusing-movement amount can be disposed on the image plane side by moving the third lens unit L3 to the image side in variation of magnification from the wide-angle end to the telephoto end, and therefore it becomes possible to minimize all movement amounts of the third lens unit L3 needed in zooming and in focusing, thereby making the lens system compact.

Further, in each embodiment, the total number of plastic lenses in the lens system is even, and the number of positive-optical-power plastic lenses is equal to the number of negative-optical-power plastic lenses, and therefore, like the relationship between the positive lens 21 and the negative lens 22 of the second lens unit L2, aberration variations caused by environmental changes are canceled by allowing aberrations generated in the positive lens to have an opposite sign with respect to aberrations generated in the negative lens while being influenced by a surface-shape change caused by temperature/humidity. In order to obtain an excellent optical performance, the zoom lens of each embodiment satisfies the following conditions. In the zoom lens of the present invention, an effect, by which the optical performance is improved or the size of the entire lens system is reduced by satisfying each conditional expression, can be obtained by satisfying at least one of the conditions.

(A-1)

The following condition is satisfied:

$$0.5 < f2s/f2 < 0.9 \quad \text{Conditional Expression (1)}$$

where f2s is the focal length of the positive optical power lens 21 disposed on the closest-to-object side of the second lens unit L2, and f2 is the focal length of the second lens unit L2.

If the upper limit value of Conditional Expression (1) is exceeded, correction deficiencies arise in the spherical aberration, which is undesirable.

If the lower limit of Conditional Expression (1) is exceeded, a difficulty arises in correcting spherical aberrations and comatic aberrations, which is undesirable.

(A-2)

The following condition is satisfied:

$$0.9 < n2p/n2n < 1.0 \quad \text{Conditional Expression (2)}$$

where n2p is the refractive index of the material of the positive-optical-power lens 21 disposed on the closest-to-object side of the second lens unit L2, and n2n is the refractive index of the material of the negative-optical-power lens 22 disposed adjacent thereto.

If the upper limit value of Conditional Expression (2) is exceeded, the Petzval sum increases in the negative direction, and a difficulty arises in correcting the curvature of field.

If the lower limit value of Conditional Expression (2) is exceeded, the Petzval sum increases in the positive direction in contrast with the above, and, likewise, a difficulty arises in correcting the curvature of field, which is undesirable.

According to the zoom lens of each embodiment, each element is set as described above, and therefore it is possible to realize a zoom lens that is suitable especially for an image pickup system using a solid-state image pickup element, that is small in the number of constituent lenses, that is compact, and that has an excellent optical performance.

Further, since the lens made of plastic is effectively used, and since the aspherical surface is employed, it is possible to effectively correct various off-axis aberrations, especially astigmatism and distortion, and correct spherical aberration caused by increasing the aperture ratio.

Next, Numeric Examples 1 through 3 that correspond to Embodiments 1 through 3, respectively, will be shown. In each numeric example, i designates the order of surfaces from the object side, ri designates the curvature radius of a i+th surface, di designates a lens thickness and an air interval between the i–th surface and the i+1–th surface, ni and νi designate the refractive index and the Abbe number, respectively, with respect to the d line. f designates a focal length, Fno designates F number, and ω designates a half angle of field.

Two surfaces on the closest-to-image side are parallel flat plates that correspond to, for example, face plates. k is conical coefficient, and B, C, D, E, and F are aspherical coefficients. The aspherical shape is expressed by the following equation:

$$x=(h^2/R)/[1+\{1-(1+k)(h/R)^2\}^{1/2}]+Bh^4+Ch^6+Dh^8+Eh^{10}+Fh^{12}$$

where x is a displacement with height "h" from the optical axis based on a facial vertex, and R is a curvature radius.

The relationship between each conditional expression and each embodiment (numeric example) is shown in Table 1.

NUMERIC EXAMPLE 1

| f = 5.38 – 10.79 | fno = F2.6 – 4.0 | 2ω = 62.6° – 33.8° | |
|---|---|---|---|
| r1 = 34.243 | d1 = 1.20 | n1 = 1.80610 | ν1 = 40.7 |
| r2 = 3.571 | d2 = 1.10 | | |
| r3 = 6.713 | d3 = 2.00 | n2 = 1.84666 | ν2 = 23.9 |
| r4 = 30.266 | d4 = Variable | | |
| r5 = (Aperture stop) | d5 = 0.80 | | |
| r6 = 3.324 | d6 = 1.80 | n3 = 1.49171 | ν3 = 57.4 |
| r7 = 12.692 | d7 = 0.50 | n4 = 1.58306 | ν4 = 30.2 |
| r8 = 3.419 | d8 = 0.68 | | |
| r9 = 21.534 | d9 = 0.60 | n5 = 1.58306 | ν5 = 30.2 |
| r10 = 6.695 | d10 = 1.60 | n6 = 1.69680 | ν6 = 55.5 |
| r11 = –12.444 | d11 = Variable | | |
| r12 = 9.015 | d12 = 1.50 | n7 = 1.49171 | ν7 = 57.4 |
| r13 = 800.264 | d13 = Variable | | |

-continued

| | d14 = 2.80 | n8 = 1.51633 | ν8 = 64.1 |
|---|---|---|---|
| r14 = ∞ | | | |
| r15 = ∞ | | | |

| | Focal length | | |
|---|---|---|---|
| variable interval | 5.38 | 7.64 | 10.79 |
| d4 | 7.66 | 4.70 | 2.07 |
| d11 | 1.90 | 7.53 | 12.77 |
| d13 | 3.98 | 2.70 | 1.82 |

Aspherical coefficient

| Surface number | r | K | B | C | D | E | F |
|---|---|---|---|---|---|---|---|
| 2 | 3.57083D+00 | −1.00599D+00 | 6.78632D−04 | 1.10721D−05 | −1.48659D−06 | 1.82326D−07 | −7.74158D−09 |
| 6 | 3.32379D+00 | −1.08624D+00 | 2.10302D−03 | 4.97777D−05 | 3.10005D−06 | | |
| 12 | 9.01539D+00 | 0.00000D+00 | −5.19269D−04 | 9.18414D−05 | −7.03831D−06 | 2.06886D−07 | |

NUMERIC EXAMPLE 2

| f = 4.00 − 10.00 | fno = F2.8 − 4.0 | 2ω = 78.6° − 36.2° | |
|---|---|---|---|
| r1 = 20.882 | d1 = 1.00 | n1 = 1.49171 | ν1 = 57.4 |
| r2 = 5.405 | d2 = 2.52 | | |
| r3 = 51.498 | d3 = 0.60 | n2 = 1.80400 | ν2 = 46.6 |
| r4 = 7.206 | d4 = 1.04 | | |
| r5 = 9.932 | d5 = 2.00 | n3 = 1.84666 | ν3 = 23.8 |
| r6 = 46.317 | d6 = Variable | | |
| r7 = (Aperture stop) | d7 = 0.00 | | |
| r8 = 4.712 | d8 = 1.80 | n4 = 1.49171 | ν4 = 57.4 |
| r9 = −10.725 | d9 = 0.32 | | |
| r10 = −8.830 | d10 = 1.40 | n5 = 1.58306 | ν5 = 30.2 |
| r11 = 5.043 | d11 = 0.43 | | |
| r12 = 8.709 | d12 = 1.60 | n6 = 1.69680 | ν6 = 55.5 |
| r13 = −13.026 | d13 = Variable | | |
| r14 = 19.910 | d14 = 1.50 | n7 = 1.49171 | ν7 = 57.4 |
| r15 = −302.095 | d15 = Variable | | |
| r16 = ∞ | d16 = 3.40 | n8 = 1.51633 | ν8 = 64.1 |

| | Focal length | | |
|---|---|---|---|
| variable interval | 4.00 | 7.09 | 10.00 |
| d6 | 13.14 | 4.71 | 1.55 |
| d13 | 2.21 | 5.05 | 8.03 |
| d15 | 3.36 | 4.36 | 5.21 |

NUMERIC EXAMPLE 3

| f = 6.50 − 13.00 | fno = F2.8 − 4.0 | 2ω = 63.2° − 34.2° | |
|---|---|---|---|
| r1 = 66.701 | d1 = 1.00 | n1 = 1.49171 | ν1 = 57.4 |
| r2 = 6.338 | d2 = 1.64 | | |
| r3 = 44.211 | d3 = 0.80 | n2 = 1.80400 | ν2 = 46.5 |
| r4 = 7.579 | d4 = 0.89 | | |
| r5 = 9.062 | d5 = 2.20 | n3 = 1.58306 | ν3 = 30.2 |
| r6 = −52.336 | d6 = Variable | | |
| r7 = (Aperture stop) | d7 = 0.00 | | |

-continued

| r8 = 6.295 | d8 = 2.20 | n4 = 1.49171 | ν4 = 57.4 |
|---|---|---|---|
| r9 = −22.489 | d9 = 1.14 | | |
| r10 = −10.437 | d10 = 0.90 | n5 = 1.58306 | ν5 = 30.2 |
| r11 = 5.764 | d11 = 0.65 | | |
| r12 = 40.470 | d12 = 0.50 | n6 = 1.58306 | ν6 = 30.2 |
| r13 = 8.079 | d13 = 2.00 | n7 = 1.80400 | ν7 = 46.6 |
| r14 = −11.487 | d14 = Variable | | |
| r15 = 18.841 | d15 = 1.60 | n8 = 1.49171 | ν8 = 57.4 |
| r16 = −107.205 | d16 = Variable | | |
| r17 = ∞ | d17 = 2.80 | n9 = 1.51633 | ν9 = 64.2 |
| r18 = ∞ | | | |

| | Focal length | | |
|---|---|---|---|
| variable interval | 6.50 | 9.80 | 13.00 |
| d6 | 11.16 | 6.39 | 1.93 |
| d14 | 2.68 | 11.54 | 13.96 |
| d16 | 5.11 | 1.16 | 2.01 |

Aspherical coefficient

| Surface number | r | K | B | C | D | E | F | G |
|---|---|---|---|---|---|---|---|---|
| 2 | 5.40547D+00 | 0.00000D+00 | 1.79936D−02 | −5.61701D−04 | 1.61551D−05 | −2.24582D−06 | 7.63002D−08 | −2.1244D−09 |
| 8 | 4.71230D+00 | −1.09795D−01 | −4.55203D−04 | −8.60311D−06 | 8.42391D−07 | −8.03342D−08 | | |
| 14 | 1.99102D+01 | 0.00000D+00 | 0.00000D+00 | −6.01215D−04 | 8.90015D−06 | 7.03373D−07 | −1.99661D−07 | 4.55392D−09 |

| Surface number | r | K | B | C | D | E | F | G |
|---|---|---|---|---|---|---|---|---|
| | | | Aspherical coefficient | | | | | |
| 2 | 6.33756D+00 | 0.00000D+00 | −5.84197D−03 | −6.49263D−04 | −8.82664D−07 | −6.81704D−07 | 1.92883D−08 | −3.72731D−10 |
| 8 | 6.29514D+600 | 0.00000D+00 | 1.81677D−02 | −6.77949D−05 | 5.27603D−06 | −4.38664D−08 | −2.03598D−09 | |
| 15 | 1.88409D+01 | 0.00000D+00 | 0.00000D+00 | −2.77373D−04 | 2.57879D−05 | −1.85356D−06 | 4.94452D−08 | |

TABLE 1

| | Lower limit | Upper limit | Numeric Example 1 | Numeric Example 2 | Numeric Example 3 |
|---|---|---|---|---|---|
| Conditional Expression (1) | | | | | |
| f2s | | | 8.715 | 8.612 | 6.924 |
| f2 | | | 12.820 | 10.662 | 10.021 |
| f2s/f2 | 0.5 | 0.9 | 0.680 | 0.808 | 0.691 |
| Conditional Expression (2) | | | | | |
| n2p | | | 1.49171 | 1.49171 | 1.49171 |
| n2n | | | 1.58306 | 1.58306 | 1.58306 |
| n2p/n2n | 0.9 | 1 | 0.942 | 0.942 | 0.942 |

According to the zoom lens of each embodiment described above, it is possible to realize a zoom lens that is suitable for an image pickup system using a solid-state image pickup element, that is small in the number of lenses, that is compact, and that has a superior optical performance.

Next, a description will be given of an embodiment of an image pickup apparatus (digital still camera) provided with the above-mentioned zoom lens with reference to FIGS. 13(A) and 13(B).

Figure 13:
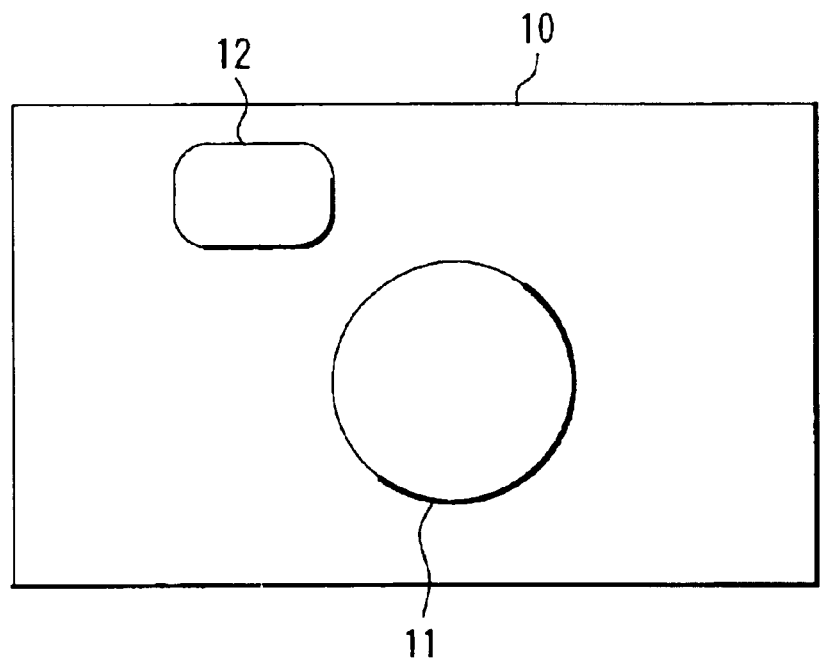
FIGS. 13(A) and 13(B) are a schematic views of a main part of a digital still camera.
Figure 13:
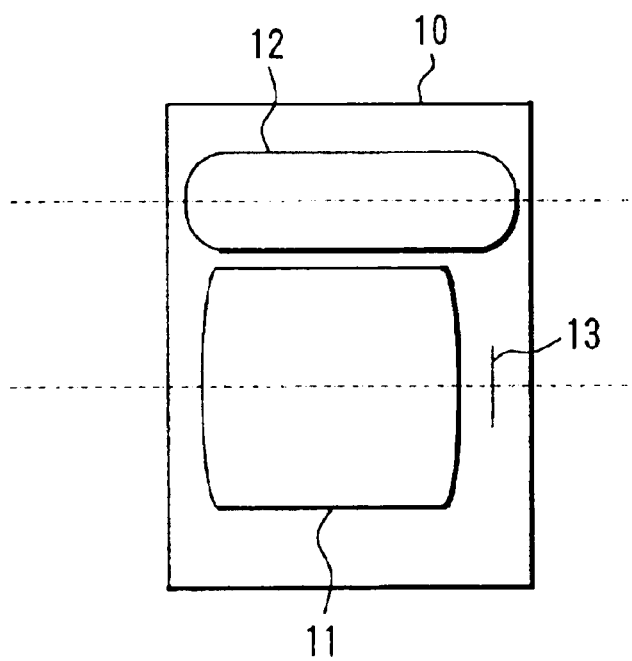

FIG. 13(A) is a front view of a digital still camera, and FIG. 13(B) is a side sectional view thereof. In the figures, 10 denotes a camera body (case), 11 denotes an image pickup optical system provided with the zoom lens of any one of Numeric Examples 1 through 5, 12 denotes a finder optical system, and 13 denotes a solid-state image pickup element (photoelectric conversion element) such as a CCD or a CMOS sensor. The solid-state image pickup element 13 receives an image of an object formed by the image pickup optical system 11 and converts it to electrical information. Image information about the object obtained by the conversion to electrical information is stored in a storage portion not shown.

A compact image pickup apparatus can be realized by applying the zoom lens of this embodiment to an image pickup optical system of a digital still camera in this way.

While preferred embodiments have been described, it is to be understood that modification and variation of the present invention may be made without departing from the spirit or scope of the following claims.

What is claimed is:

1. A zoom lens system comprising, in order from an object side to an image side;
   a first lens unit having negative optical power, the first lens unit including at least one positive lens element and at least one negative lens element;
   a second lens unit having positive optical power, the second lens unit including at least one positive lens element and at least one negative lens element, wherein the lens element of the second lens unit disposed on the closest-to-object side is a plastic lens element having positive optical power; and
   a third lens unit having positive optical power;
   wherein each lens unit moves in the direction of an optical axis for zooming, and further the following condition is satisfied:

$0.5 < f2s/f2 < 0.9$ where f2s is a focal length of said plastic lens element of positive optical power, and f2 is a focal length of said second lens unit.

2. The zoom lens system according to claim 1, wherein a surface on the object side of said plastic lens element of positive optical power is aspherical.

3. The zoom lens system according to claim 1, wherein said second lens unit has a plastic lens element with negative optical power, which is adjacent to an image side of said plastic lens element of positive optical power.

4. The zoom lens system according to claim 3, wherein the following condition is satisfied:

$0.9 < n2p/n2n < 1.0$ wherein n2p is a refractive index of material of said plastic lens element of positive optical power, and n2n is a refractive index of material of said plastic lens element of negative optical power.

5. The zoom lens system according to claim 1, wherein said third lens unit has a plastic lens element with positive optical power.

6. The zoom lens system according to claim 1, wherein each lens unit has at least one plastic lens element, and the total number of plastic lens elements included in each lens unit is even, and the number of plastic lens elements of positive optical power is equal to the number of plastic lens elements of negative optical power.

7. The zoom lens system according to claim 1, wherein each lens unit has at least one plastic lens element, and the plastic lens element included in each lens unit is an aspherical lens element.

8. The zoom lens system according to claim 1, wherein said third lens unit moves to the object side for focusing from an infinite-distance object to a short-distance object.

9. The zoom lens system according to claim 1, wherein said zoom lens system forms an image on a photoelectric conversion element.

10. An image pickup apparatus comprising:
    the zoom lens system according to claim 1, and
    a photoelectric conversion element by which an image formed by said zoom lens system is received.

11. A zoom lens system comprising, in order from an object side to an image side:
    a first lens unit having negative optical power, the first lens unit including at least one positive lens element and at least one negative lens element;

a second lens unit having positive optical power, the second lens unit including at least one positive lens element and at least one negative lens element, the lens of the second lens unit disposed on the closest-to-object side being a plastic lens element having positive optical power; and a third lens unit having positive optical power;

wherein each lens unit moves in the direction of an optical axis for zooming, and said second lens unit has a plastic lens element with negative optical power, which is adjacent to an image side of said plastic lens element of positive optical power.

12. The zoom lens system according to claim 11, wherein the following condition is satisfied:

$$0.9 < n2p/n2n < 1.0$$

where n2p is a refractive index of material of said plastic lens element of positive optical power, and n2n is a refractive index of material of said plastic lens element of negative optical power.

13. The zoom lens system according to claim 11, wherein said zoom lens forms an image on a photoelectric conversion element.

14. A zoom lens system comprising, in order from an object side to an image side:

a first lens unit having negative optical power, the first lens unit including at least one positive lens element and at least one negative lens element;

a second lens unit having positive optical power, the second lens unit including at least one positive lens element and at least one negative lens element, the lens of the second lens unit disposed on the closest-to-object side being a plastic lens element having positive optical power; and a third lens unit having positive optical power;

wherein each lens unit moves in the direction of an optical axis for zooming, and said third lens unit has a plastic lens element with positive optical power.

15. The zoom lens system according to claim 14, wherein each lens unit has at least one plastic lens element, and the total number of plastic lens elements included in each lens unit is even, and the number of plastic lens elements of positive optical power is equal to the number of plastic lens elements of negative optical power.

16. The zoom lens system according to claim 14, wherein each lens unit has at least one plastic lens element, and the plastic lens element included in each lens unit is an aspherical lens.

17. The zoom lens system according to claim 14, wherein said zoom lens system forms an image on a photoelectric conversion element.

18. An image pickup apparatus comprising:

the zoom lens system according to claim 11, and a photoelectric conversion element by which an image formed by said zoom lens system is received.

19. An image pickup apparatus comprising:

the zoom lens system according to claim 14, and a photoelectric conversion element by which an image formed by said zoom lens system is received.

* * * * *